(12) United States Patent
Rotwitt

(10) Patent No.: US 7,186,007 B1
(45) Date of Patent: Mar. 6, 2007

(54) PORTABLE STAND FOR ARTICULATED ARM DEVICES

(76) Inventor: Frederick Alan Rotwitt, 381 Kintner Rd., Kintnersville, PA (US) 18930

(*) Notice: Subject to any disclaimer, the term of this patent is extended or adjusted under 35 U.S.C. 154(b) by 83 days.

(21) Appl. No.: 11/106,409

(22) Filed: Apr. 14, 2005

Related U.S. Application Data

(60) Provisional application No. 60/565,453, filed on Apr. 26, 2004.

(51) Int. Cl.
*F21V 21/30* (2006.01)

(52) U.S. Cl. ............ 362/287; 362/285; 362/410; 362/418; 362/419; 362/427; 362/428; 248/163.1

(58) Field of Classification Search ......... 362/285, 362/287, 410, 418, 419, 427, 428; 248/163.1, 248/166–171
See application file for complete search history.

(56) References Cited

U.S. PATENT DOCUMENTS

| 1,255,185 | A |  | 2/1918 | Lehmkuhl |
|---|---|---|---|---|
| 1,340,108 | A |  | 5/1920 | Blasco |
| 2,090,439 | A |  | 8/1937 | Carwardine |
| 3,961,176 | A |  | 6/1976 | Gleason ............... 240/81 BC |
| 4,213,172 | A |  | 7/1980 | Scattolin et al. ........... 362/413 |
| D265,764 | S |  | 8/1982 | Franks ................ D26/64 |
| D305,155 | S |  | 12/1989 | De Lucchi .............. D26/65 |
| 5,060,894 | A |  | 10/1991 | Hillinger ................ 248/170 |
| 5,170,975 | A |  | 12/1992 | Chadwick ............... 248/284 |
| 5,236,160 | A |  | 8/1993 | Sechelski ............... 248/125 |
| D350,410 | S |  | 9/1994 | Gehlhar ................ D26/140 |
| 5,428,520 | A |  | 6/1995 | Skief .................. 362/427 |
| 5,613,771 | A | * | 3/1997 | Siverling ............... 362/401 |
| D388,211 | S |  | 12/1997 | Yang .................. D26/65 |
| D397,234 | S |  | 8/1998 | Huang ................ D26/63 |
| 5,871,185 | A | * | 2/1999 | Phillips et al. .......... 248/167 |
| 5,890,793 | A |  | 4/1999 | Stephens ............... 362/225 |
| 6,213,626 | B1 |  | 4/2001 | Qian .................. 362/413 |
| 6,454,228 | B1 |  | 9/2002 | Bosnakovic ........... 248/177.1 |
| 6,554,459 | B2 |  | 4/2003 | Yu et al. ................ 362/418 |

* cited by examiner

*Primary Examiner*—Stephen F Husar
*Assistant Examiner*—Meghan K. Dunwiddie
(74) *Attorney, Agent, or Firm*—Howson & Howson LLP

(57) ABSTRACT

A portable stand for an articulated arm that carries a device, such as a lamp. The stand includes a post having a lower end with a plurality of support legs for supporting the post freely on an underlying surface and an upper end having a bushing. The articulated arm can be mounted on the upper end of the stand by inserting a lug of the articulated arm into the bushing. The stand also includes means on an upper end of the post for ensuring that the articulated arm is positioned in vertical alignment over one of the support legs of the post. Thus, as the articulated arm is fully extended in a lateral direction from the post, the center of gravity of the articulated arm remains over the support leg thereby permitting the stand to remain stable.

16 Claims, 4 Drawing Sheets

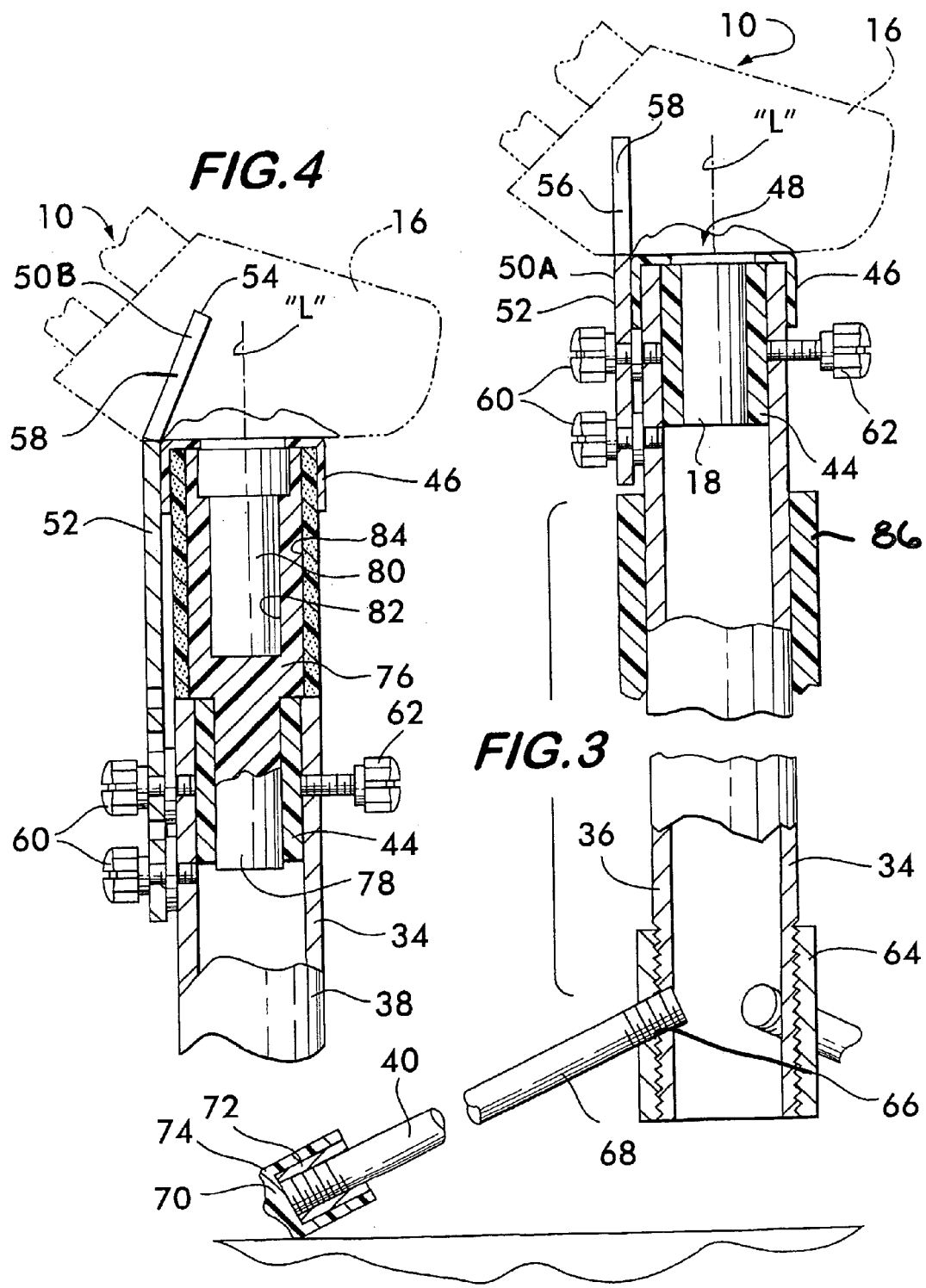

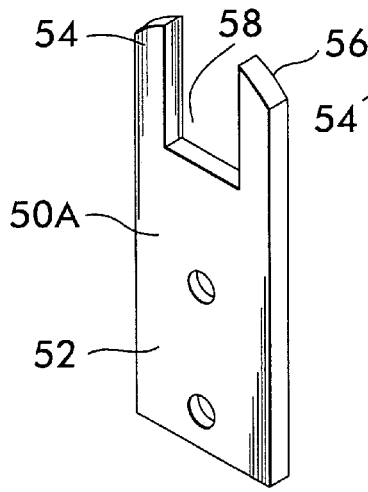
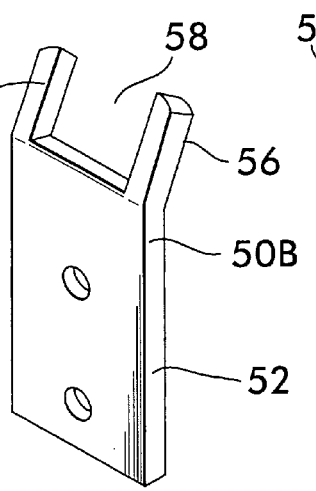
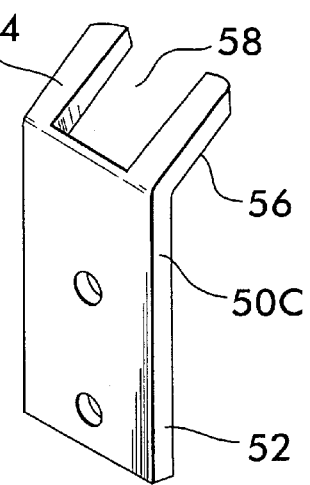
FIG.5  FIG.6  FIG.7
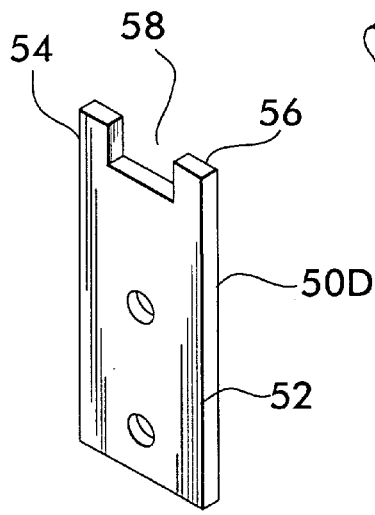
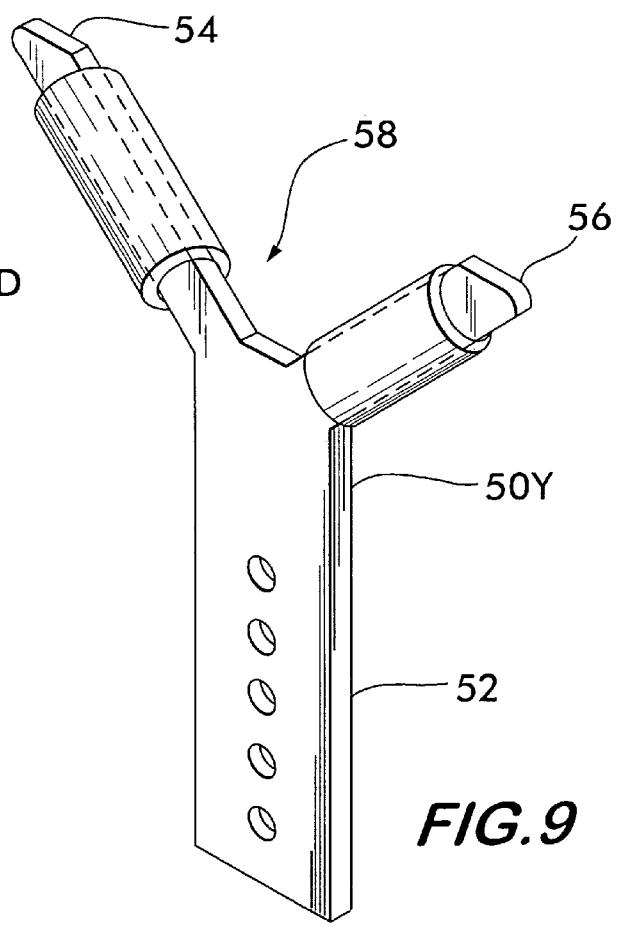
FIG.8
FIG.9

PORTABLE STAND FOR ARTICULATED ARM DEVICES

CROSS-REFERENCE TO RELATED APPLICATION

This application claims the benefit under 35 USC §119(e) of U.S. Provisional Application No. 60/565,453, filed Apr. 26, 2004.

BACKGROUND OF THE INVENTION

The present invention relates to a stand or base for a device, such as a lamp, suspended from an articulated arm, and more particularly, the present invention relates to a portable stand that supports articulated arm lamps and the like in a stable manner on an underlying surface.

FIG. 1 illustrates the conventional manner in which a prior art articulated arm lamp is mounted to an edge of a table 12 via a mounting clamp 14. Typically, the articulated arm lamp has a mounting bracket 16 with a depending lug 18 that is engaged by the mounting clamp 14. The lamp can be re-positioned in upward, downward, or lateral directions by extending and/or retracting the articulated arm 22, and the bracket 16 and arm 22 are freely rotatable about mounting clamp 14. A disadvantage of using a mounting clamp 14 is that it requires the presence of a table edge or the like, thereby limiting the use and placement of the articulated arm and lamp.

U.S. Pat. No. 5,613,771 issued to Siverling discloses an articulated swing arm lamp mounted on a tripod stand. The lamp is permitted to rotate freely about the stand, and the use of a counterbalance weight is necessary to ensure that the stand remains stable when the articulated arm is extended laterally of the stand. U.S. Pat. No. 5,060,894 issued to Hillinger, U.S. Pat. No. 3,961,176 issued to Gleason, D.350,410 issued to Gehlhar, U.S. Pat. No. 6,554,459 issued to Yu et al., U.S. Pat. No. 6,454,228 issued to Bosnakovic, U.S. Pat. No. 5,890,793 issued to Stephens, U.S. Pat. No. 5,871,185 issued to Phillips et al., D.397,234 issued to Huang, and D.265,764 issued to Franks disclose various tripod lamp stands, and U.S. Pat. No. 5,428,520 issued to Skief, U.S. Pat. No. 5,236,160 issued to Sechelski, U.S. Pat. No. 6,213,626 issued to Qian, U.S. Pat. No. 1,255,185 issued to Lehmkuhl, U.S. Pat. No. 1,340,108 issued to Blasco, U.S. Pat. No. 2,090,439 issued to Carwardine, D.305,155 issued to De Lucchi, and D.388,211 issued to Yang disclose other lamp stands known in the art.

Although the lamp stands and bases disclosed in the above referenced patents may function satisfactorily for their intended purposes, there remains a need for an inexpensive portable lamp stand that remains stable when an articulated arm of a lamp is fully extended laterally of the stand. Preferably, the stand should be capable of use with a range of types of articulated arms and should be able to accommodate a range of sizes of articulated arm mounting brackets and lugs.

BRIEF SUMMARY OF THE INVENTION

More specifically, the present invention is a portable stand for an articulated arm that carries a device, such as a lamp. The stand includes an upright post having a lower end with a plurality of support legs for supporting the post freely on an underlying surface and has an upper end having a bushing. The articulated arm can be mounted on the upper end of the stand by inserting a lug of the articulated arm into the bushing. The stand also includes means on an upper end of the post for engaging the mounting bracket of the articulated arm, for preventing rotation of the articulated arm relative to the bushing, and for ensuring that the articulated arm is positioned in vertical alignment over one of the support legs of the post. Thus, as the articulated arm is fully extended in a lateral direction from the post, the center of gravity of the articulated arm remains over the support leg and the stand remains stable.

BRIEF DESCRIPTION OF THE DRAWINGS

The foregoing and other objects, features and advantages of the present invention should become apparent from the following description when taken in conjunction with the accompanying drawings, in which:

FIG. 3 is a cross-sectional view of the upper and lower ends of the stand;

FIG. 4 is a cross-sectional view of the upper end of the stand with an installed adaptor; and FIGS. 5–9 are perspective view of various locating brackets for use with the stand.

DETAILED DESCRIPTION OF THE INVENTION

Figure 1:
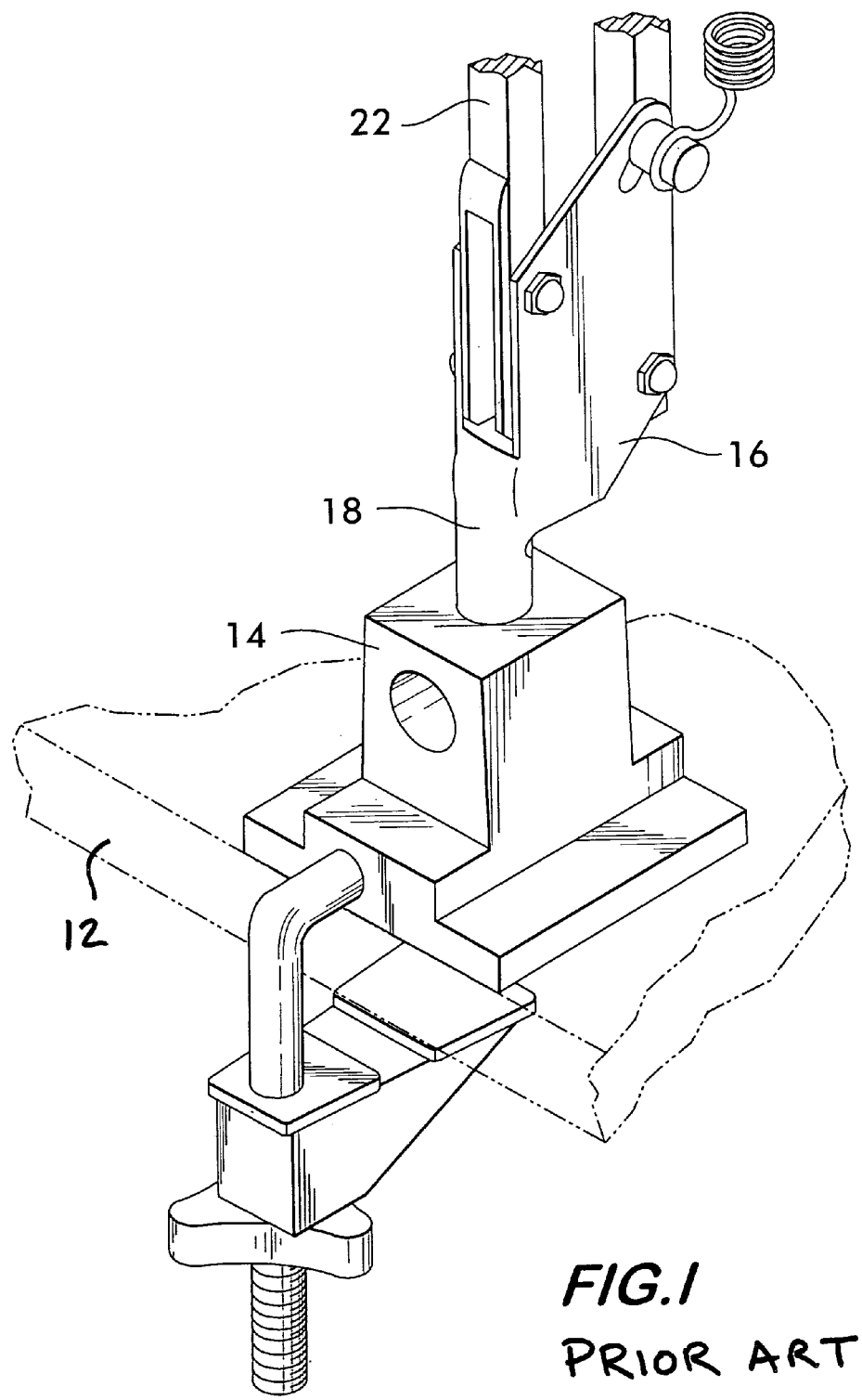
FIG. 1 is a perspective view of a prior art mounting clamp of an articulated arm mounted to the edge of a table.
Figure 2:
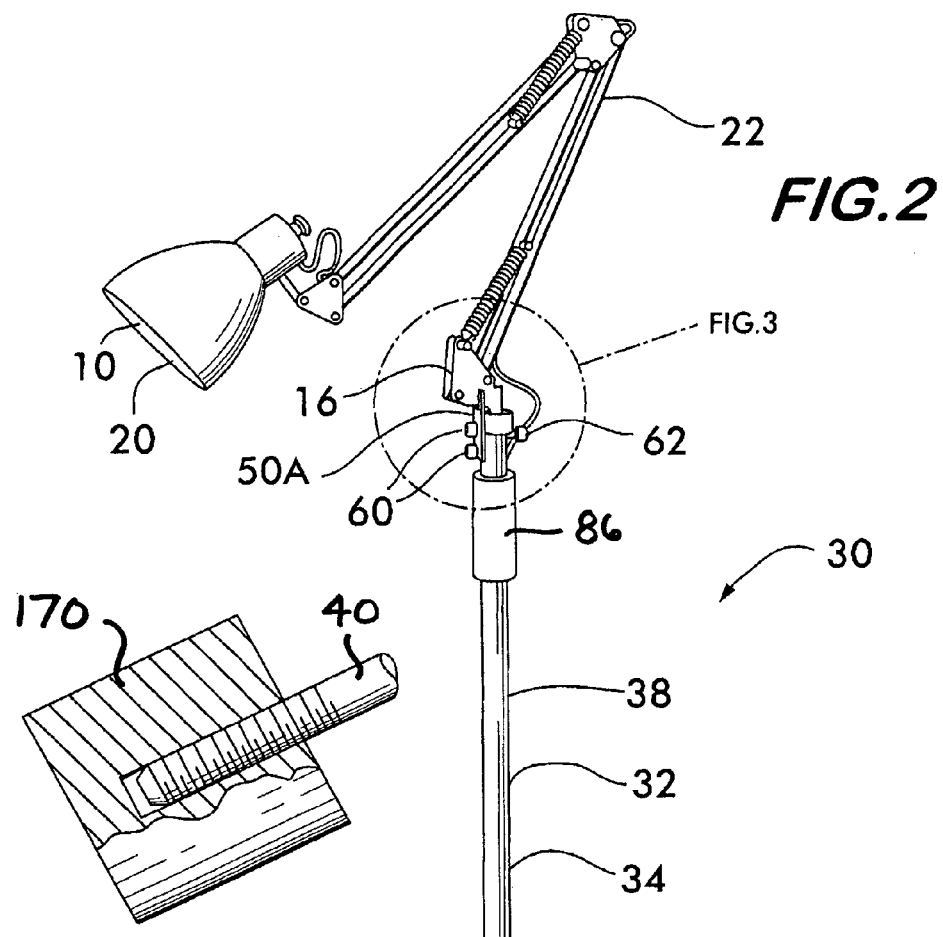
FIG. 2 is a perspective view of a stand and lamp combination according to the present invention.

Referring now to the drawings, FIG. 2 illustrates an embodiment of a stand/lamp combination 30 according to the present invention which includes an articulated arm lamp 10 mounted on a portable stand 32. The stand 32 can be positioned anywhere on an underlying surface, such as a floor or like surface. Thus, the articulated arm lamp 10 can be positioned as desired regardless of whether or not a table edge or the like is available for supporting a prior art mounting clamp (as shown in FIG. 1).

Preferably, the body of the stand 32 is formed by a post 34 having a lower end 36 and an upper end 38, and a plurality of legs 40 are mounted to the lower end 36 so that the post 34 can be stood in a substantially upright position on an underlying surface (ie., floor 42 as shown in the drawings). The illustrated embodiment of stand 32 includes three equally spaced-apart legs 40 that form a tripod stand structure. The upper end 38 of the post 34 provides a location for mounting an articulated arm lamp 10 as discussed in greater detail below. Thus, as shown in FIG. 2, the stand 32 can support an articulated arm lamp 10 in a convenient manner.

An important aspect of the stand 32 of the present invention is that it includes means for ensuring that the center of gravity of the articulated arm lamp 10 is located directly (ie., vertically) above one of the legs 40 of the stand 32. To this end, the center of gravity of the articulated arm lamp 10 falls within a vertical plane extending through one of the legs 40 of the stand. This ensures that the stand/lamp combination 30 remains stable at all times, even when the lamp 20 is fully extended in a lateral direction from the upper end 36 of the post 34. The stable condition is achieved without having to secure the stand 32 to an underlying surface with fasteners or the like.

Preferably, the upper end 38 of the post 34 houses a bushing 44 which is capable of receiving a lug 18 of an articulated arm lamp 10 so that the lamp 10 can be mounted and supported on the stand 32. For example, the bushing 44 can be made of nylon having an outer diameter of about 13/16 inch and an inner diameter of about 0.5 inch. Thus, a standard sized lug 18 can be inserted into the bushing 44 to mount the articulated arm lamp 10 to the stand 32. Preferably, the upper end 38 of the post 34 is covered by a protective plastic cap 46 that provides a protective barrier between the lamp 10 and post 34 and that has an opening 48 permitting the lug 18 to enter the bushing 44.

The means for ensuring that the articulated arm lamp 10 remains over one of the legs 40 of the stand 32 can be provided, for example, as a locating bracket 50A, 50B, 50C, 50D or 50Y as shown in FIGS. 5–9. To this end, each locating bracket includes a mounting plate 52 and a pair of guides, 54 and 56, that extend from the mounting plate 52 and define an open slot 58 therebetween. Preferably, the open slot 58 is of a size to receive, engage and capture the mounting bracket 16 of the articulated arm lamp 10. This prevents rotation of the mounting bracket 16 and lamp 10 relative to the bushing 44 and upper end 38 of the post 34.

The locating bracket is secured to the upper end 38 of the post 34 such that the slot 58 is aligned with one of the legs 40 of the stand 32 and directs the articulated arm over one of the legs 40. Thus, when the articulated arm lamp 10 is extended laterally from the post 34, the center of gravity of the articulated arm lamp 10 remains over the support leg 40 to ensure stability of the stand.

Preferably, the stand 32 is provided with a series of interchangeable locating brackets of different sizes and shapes. This permits the stand 32 to be utilized with various size and types of articulated arm lamps. For example, the guides, 54 and 56, can extend parallel to the mounting plate 52 and/or parallel to a longitudinal axis "L" of post 34, when mounted to post 34. See locating brackets 50A and 50D. Alternatively, the guides, 54 and 56, can extend at an angle relative to the mounting plate 52 and/or longitudinal axis "L" of post 34. See, for instance, locating brackets 50B and 50C. Yet another alternative is to provide guides 54 and 56 that extend at an angle relative to each other, for instance, in a Y-shaped configuration as shown with respect to locating bracket 50Y. Still further, the locating brackets can include a middle guide such that a total of three guides are present defining two separate slots.

Preferably, at least one fastener 60 is utilized to secure the mounting plate 52 of the locating bracket to the upper end 38 of the post 34. This permits the various locating brackets to be interchangeable. Preferably, the locating brackets are secured to the post 34 such that the guides, 54 and 56, and slot 58 extend above the upper end of post 34. In addition, when locating bracket 50B or 50C is utilized, the angled guides, 54 and 56, are positioned such that they extend upwardly and inwardly over the upper end 38 of the post 34. See FIG. 4.

A locking fastener 62 can also be utilized to prevent rotation of the articulated arm lamp 10 relative to the post 34 and to lock the lug 18 of the articulated arm lamp 10 within the bushing 44. As best illustrated in FIGS. 3 and 4, the locking fastener 62 extends into the upper end 38 of the post 34 opposite the location of the locating bracket. The locking fastener 62 engages the lug 18 within the bushing 44 thereby ensuring that the mounting bracket 16 of the articulated arm lamp 10 remains captured within the slot 58 of the locating bracket. This in turn further ensures that the articulated arm remains over one of the legs 40 of the stand 32 to ensure stability of the stand 32.

Preferably, the legs 40 of the stand 32 are removable from the post 34. In one contemplated embodiment of the present invention, the post 34 is formed of a length of approximately 34.5 inches, and the lower end 36 of the post 34 is threaded and mounts to a threaded pipe coupling 64. Threaded leg mounting holes 66 are formed through the coupling 64 and post 34 so that threaded ends 68 of the legs 40 can be secured thereto. For example, the legs 40 can be approximately 12 inches in length and, when mounted to the post 34, can extend at an angle "A" of about 18° from the underlying surface 42. Such an embodiment provides a relatively compact stand footprint "F" having a diameter "D" no greater than about 29 inches. Thus, the stand 32 is portable, lightweight and relatively compact enabling it to be utilized in most places where a lamp is desired.

Accordingly to an alternate contemplated embodiment of the present invention, support legs 40 can be of different lengths. Preferably, the support leg 40 that is aligned with and located directly below the locating bracket is longer than the other support legs. For example, the support leg 40 located directly below the locating bracket can be about 0.5 to about 1.0 inch longer than the other two support legs, which can be of equal length. This permits the stand to compensate for flexure of the stand which may be experienced when the articulated arm device is fully extended laterally of the post. It has also been found to ensure post perpendicularity of the stand on all floor surfaces, including plush carpeted surfaces.

The length of the legs 40 can also be made to be adjustable so that the post 34 can be supported in a substantially vertical position even if the underlying surface is uneven or not level to the horizontal. To this end, an adjustable foot 70 can be mounted on the end of each leg 40 so that, if desired, the length of each leg 40 can be independently adjusted. For example, the foot 70 can be provided as a knurled brass foot adjustment 72 that is threaded to a threaded end of the leg 40. Thus, the total length of the leg 40 and foot 70 depends on how far the foot adjustment 72 is threaded onto the leg 40 and how much of the foot adjustment 72 extends from the end of the leg 40. Preferably, a plastic cap 74 or the like is slid over the foot adjustment 72 to protect the underlying surface 42 and to provide a non-skid interface between the leg 40 and underlying surface 42.

Figure 2A:
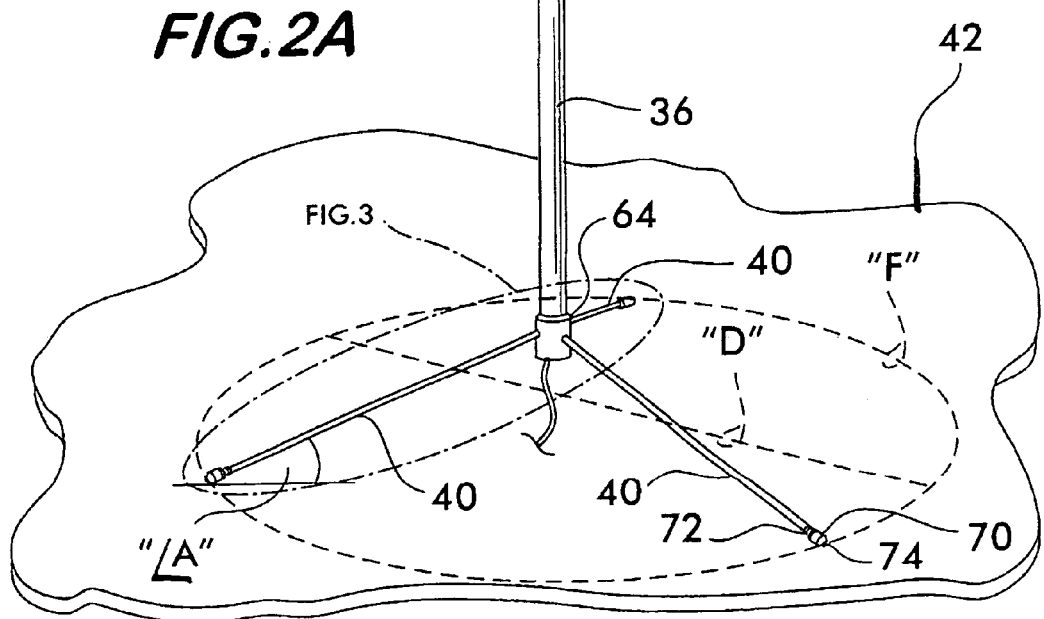
FIG. 2A is a partially cut-away elevational view of an alternate weighted foot connected to an end of a support leg.

As an alternative to foot 70, a weighted foot 170 such as illustrated in FIG. 2A can be utilized. As an example, the weighted foot 170 can be provided as a CRS cylinder that weighs about 0.5 pound and that is about 1.5 inches in length and about 1.5 inches in diameter. A protective plastic cap can be placed over the cylinder. The weighted foot 170 is threaded onto the end of the support leg 40 and can be utilized to adjust the overall length of the leg 40 and foot 170 combination as described above. The additional weight enhances the stability of the stand, particularly with respect to forces impacting the stand, such as when the stand is bumped into by a child, pet or the like. The amount of weight provided by the foot 170 and its size can be altered as desired.

In another contemplated embodiment of the present invention, the stand can include about a 1.25 pound weight added within the lower end 36 of the hollow post 34. For example, the hollow post 34 can be filled with copper shot or the like from about a mid-portion of the post 34 to its lower end 36 held in position by a pair of plugs. Of course, a solid weight such as a plate or the like can also be utilized. The additional weight in the post 34 in combination with the use of three weighted feet 170 on the legs 40 can add approximately 2.75 pounds, or more, of extra weight to the lower end 36 of the stand to further improve stand stability and to provided tipping resistance in the event of an impact.

Articulated arm lamps 10 made by different lamp manufactures may have different sized lugs 18. For this reason, one or more adaptors 76 can be provided with the stand 32. As best illustrated in FIG. 4, the adaptor 76 can have a lug extension 78 that fits snugly within bushing 44 and an upwardly opening end 80 that extends above the lug extension 78 and that defines a bore 82 extending therein. The size of bore 82 can be larger or smaller than the inner diameter of the bushing 44 so that it can receive different sized and shaped lugs 18 of articulated arm lamps 10. Preferably, the adaptor 76 is made of nylon and its exposed sides are covered with a foam protective sleeve 84. Thus, the stands 32 can be provided with one or more adaptors 76 so that articulated arm lamps having lugs 18 of any size can be mounted on stand 32.

The stand 32 can also include a grippable sleeve 86 that extends about the upper end 38 of the post 34 directly below the locating bracket. The sleeve 86 provides a hand grip for the stand 32 and can be made of soft foam or like material. The hand grip encourages handling of the stand 32 at a desired location.

The stand 32 as described above provides a stable base for supporting articulated arm lamps 10 and/or any other device that is mounted on the end of an articulated arm. In addition, since the stand 32 can be provided with a series of interchangeable locating brackets and adaptors, the stand 32 can accommodate any size or type of articulated arm device. Further, the adjustable and/or different length legs 40 permit the stand 32 to be used on level as well as uneven or angled underlying surfaces.

While a preferred stand has been described in detail, various modifications, alterations, and changes may be made without departing from the spirit and scope of the present invention as defined in the appended claims.

The invention claimed is:

1. A portable stand for an articulated arm lamp, comprising:
   a post on which the articulated arm lamp is removably mountable, said post having a bushing at an upper end thereof for receiving a lug of the articulated arm lamp and a plurality of support legs at a lower end thereof for supporting the stand freely on an underlying surface;
   a locating bracket on an upper end of said post for positioning the articulated arm lamp in vertical alignment over a predetermined one of said support legs of said post when the articulated arm lamp is extended laterally of said post so that a center of gravity of the articulated arm lamp remains over said predetermined one of said support legs, said locating bracket having a mounting plate and at least a pair of guides that extend therefrom and that define at least one open slot therebetween of a size to receive and capture a mounting bracket of the articulated arm lamp thereby preventing rotation of the mounting bracket relative to said upper end of said post; and
   at least one fastener securing said mounting plate of said locating bracket to said upper end of said post such that said guides extend above said upper end of said post.

2. A portable stand according to claim 1, further comprising a locking fastener that extends into said upper end of said post opposite said locating bracket to engage and secure the lug of the articulated arm lamp within said bushing.

3. A portable stand according to claim 1, further comprising an adaptor having a lug depending therefrom sized to fit within said bushing and having an upwardly opening end extending above said adaptor lug and defining a bore extending therein for receiving said lug of said articulated arm, whereby said adaptor and bushing permit articulated arm lugs of different sizes to be mounted on said stand.

4. A portable stand according to claim 1, wherein, when said locating bracket is secured to said post, said pair of guides are parallel to each other and to said post.

5. A portable stand according to claim 1, wherein, when said locating bracket is secured to said post, said pair of guides are parallel to each other and extend at an angle relative to a longitudinal axis of said post such that said guides extend upwardly and inwardly relative to said upper end of said post.

6. A portable stand according to claim 1, wherein said locating bracket is Y-shaped.

7. A portable stand according to claim 1, wherein said post has three support legs with said predetermined one of said support legs being longer than said other support legs.

8. A portable stand for an articulated arm lamp, comprising:
   a post on which the articulated arm lamp is removably mountable, said post having a bushing at an upper end thereof for receiving a lug of the articulated arm lamp and a plurality of support legs at a lower end thereof for supporting the stand freely on an underlying surface; and
   means on an upper end of said post for positioning the articulated arm lamp in vertical alignment over a predetermined one of said support legs of said post when the articulated arm lamp is extended laterally of said post so that a center of gravity of the articulated arm lamp remains over said predetermined one of said support legs;
   each of said support legs being removable and including a weighted foot of at least about 0.5 lbs that is adjustably connected to an end of said support leg for adjusting a length of said support leg.

9. A portable stand according to claim 8, wherein said support legs extend at an angle of about 18° from the underlying surface, said post extends substantially vertically, and a footprint of said support legs defines no greater than about a 29 inch footprint diameter.

10. A combination stand and articulated arm, comprising:
    an articulated arm carrying a device at one end thereof and a mounting bracket at an opposite end thereof, said mounting bracket having a lug depending therefrom;
    an upright stand on which said articulated arm is removably mountable, said stand having a bushing at an upper end thereof for receiving said lug and a plurality of support legs at a lower end thereof for supporting said stand freely on an underlying surface;
    a locating bracket removably secured on said upper end of said stand for engaging said mounting bracket of said articulated arm and for preventing rotation of said articulated arm relative to said bushing, said locating bracket positioning said articulated arm in vertical alignment over a predetermined one of said support legs of said stand when said articulated arm is extended laterally of said stand so that a center of gravity of said articulated arm remains over said predetermined one of said support legs and said stand remains stable; and
    an adaptor having an adaptor lug depending therefrom sized to fit within said bushing and having an upwardly opening end extending above said adaptor lug and defining a bore extending therein for receiving said lug of said articulated arm, whereby said adaptor permits articulated arm lugs of different sizes to be mounted on said stand.

11. A combination stand and articulated arm according to claim 10, wherein said locating bracket has a mounting plate secured to said upper end of said stand and a pair of guides extending therefrom above said upper end of said stand, said guides defining an open slot therebetween of a size to receive and capture said mounting bracket of said articulated arm to thereby restrict rotation of said mounting bracket relative to said upper end of said stand.

12. A combination stand and articulated arm according to claim 11, wherein said device carried by said articulated arm is a lamp.

13. A combination stand and articulated arm according to claim 12, wherein said stand includes a plurality of interchangeable, differently-shaped locating brackets including locating brackets that have guides which extend parallel to each other and guides which extend at an angle to each other and that have guides which, when secured to said stand, extend parallel to a longitudinal axis of said stand and guides which extend at an angle to said longitudinal axis.

14. A combination stand and articulated arm according to claim 11, wherein said post has three support legs with said predetermined one of said support legs being about 0.5 to about 1.0 inch longer than said other support legs.

15. A combination stand and articulated arm according to claim 11, wherein each of said support legs is removable and has a weighted foot of at least about 0.5 lbs adjustably connected to an end of said support leg so that a length of said support leg is adjustable, whereby said stand is portable and is capable of being positioned on an uneven underlying surface in a stable condition.

16. A combination stand and articulated arm according to claim 11, wherein said support legs extend at an angle of about 18° from the underlying surface, said stand extends substantially vertically, and said support legs define a footprint having a diameter no greater than about 29 inches.

* * * * *